W. H. PUTTOCK.
STEERING TRUCK.
APPLICATION FILED APR. 7, 1917.

1,258,610.

Patented Mar. 5, 1918.

WITNESSES:
Charles Pickles
Thos. Castberg

INVENTOR
William H. Puttock
BY Strong & Townsend
ATTORNEYS

UNITED STATES PATENT OFFICE.

WILLIAM H. PUTTOCK, OF SPOKANE, WASHINGTON, ASSIGNOR TO THE HOLT MANUFACTURING COMPANY, OF STOCKTON, CALIFORNIA, A CORPORATION OF CALIFORNIA.

STEERING-TRUCK.

1,258,610.     Specification of Letters Patent.     Patented Mar. 5, 1918.

Application filed April 7, 1917. Serial No. 160,478.

*To all whom it may concern:*

Be it known that I, WILLIAM H. PUTTOCK, a citizen of the United States, residing at Spokane, in the county of Spokane and State of Washington, have invented new and useful Improvements in Steering-Trucks, of which the following is a specification.

This invention relates to steering trucks of the character shown and described in the application of Goodman and Holden, Serial Number 138,771, filed December 26, 1916; and has for its object to simplify and improve the construction and operation of a truck of this character.

The present structure includes novel means of connecting the roller bearings to the turnable ring in position to support the stationary ring, the roller bearings being journaled in carrying frames, which latter are connected directly to and supported upon the turnable truck ring. The upwardly bowed straps or truss bars, carried on the axle of the truck, have their adjacent ends connected together by arcuate plates upon which the ring of the truck frame is supported, said arcuate plates also being extended beneath the ring on the vehicle frame to assist in supporting the same and to limit the rocking movement between the two rings. Otherwise there is a general simplification or re-arrangement of the parts throughout, whereby to produce a more economical construction and one capable of easy assembling.

A preferred form of my invention is exemplified in the following description and illustrated in the accompanying drawings, in which—

Figure 1:
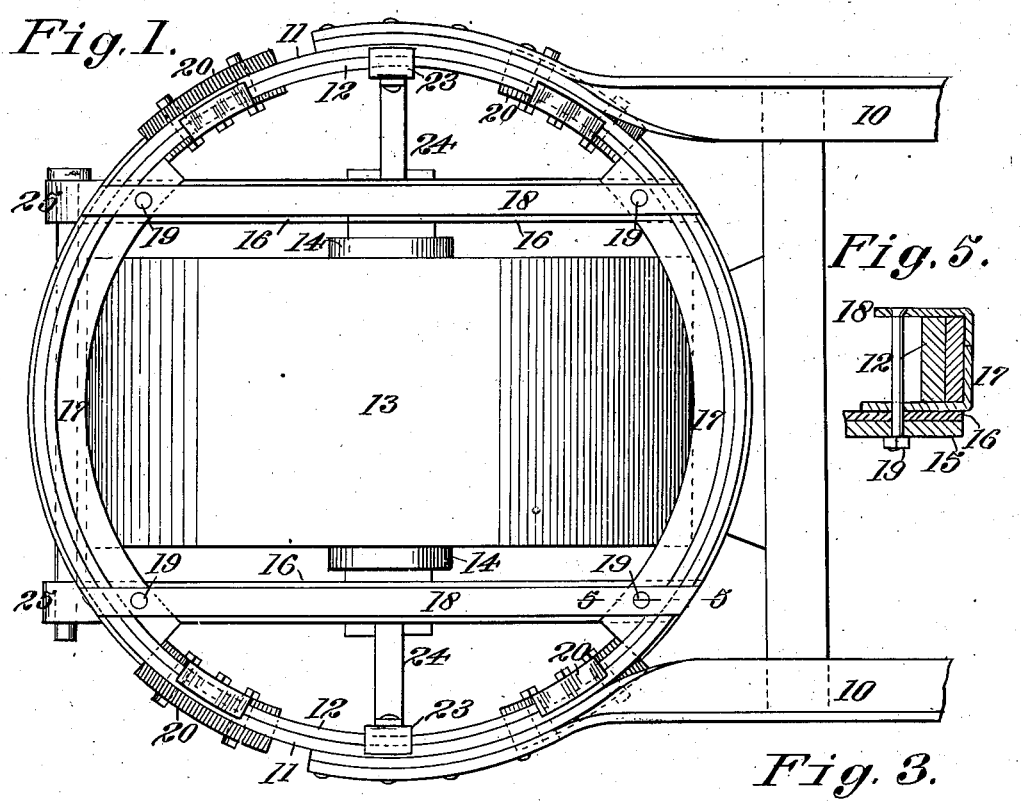
Figure 1 shows a plan view of the steering truck connected to the front end of a vehicle frame.
Figure 5:
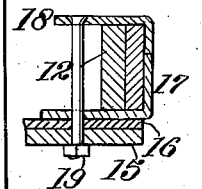
Fig. 5 shows a sectional view, taken on the line 5—5 of Fig. 1.
Figure 2:
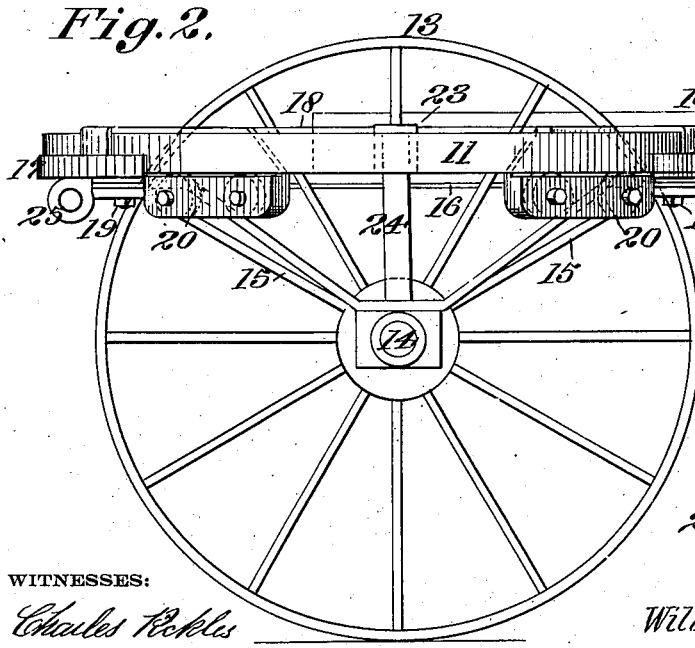
Fig. 2 shows a side elevation of the same.
Figure 3:
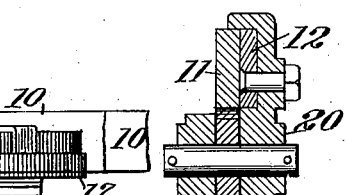
Figs. 3 and 4 show detail views of the roller bearings and their carrying frames.
Figure 4:
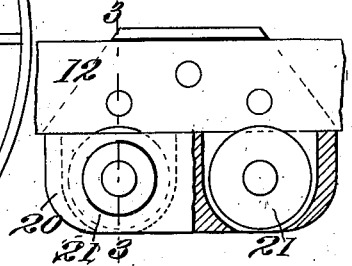

The forwardly extending frame bars 10 of a vehicle, such as a combined harvester and thresher, are connected to a ring 11 which is telescopically received upon a ring 12, the latter being connected to and carried by the steering truck. The steering truck comprises a wheel or wheels 13, axle 14, a pair of upwardly bowed truss bars 15 arranged transversely of the axle, tie bars 16 connecting the opposite ends of each truss bar, and arcuate bars 17 angular in cross section connecting the adjacent ends of opposite truss bars, the flanges of the arcuate bars lying outside of the ring 11 and projecting vertically and the base portion of the arcuate bars lying beneath and supporting both rings 10 and 11.

Bars 18, extending parallel with the tie bars, overlie the telescoping rings and are bent downwardly at their ends, outside of the outer ring 11, and secured to the truss bars and arcuate plates 17 by means of vertically extending bolts 19 located within the rings, whereby to retain the telescoping rings against axial movement relatively.

The inner or movable ring 12 has secured upon it, at opposite sides of the wheel 13 fore and aft of the axis thereof, a roller carrier 20, journaled within which is a pair of roller bearings 21 in position to engage beneath the outer ring 11 and support the same turnably with relation to the inner ring. There are four such roller carriers so spaced and arranged as to receive an equal distribution of the weight and to overcome any lateral tilting action of the truck mechanism or vehicle frame. The roller carriers, it will be noted, are supported entirely upon the inner ring 12.

Clips 23 are secured to the inner ring and overlie the outer ring and serve to retain the rings together, and brace bars 24 are connected to the inner ring adjacent to each clip and extend downwardly and inwardly where they are connected to and supported upon the axle. These brace bars in effect form another truss for the turntable ring and serve to support the portions of said ring disposed at the sides of the wheel. It will be noted that this arrangement of truss bars provides a support for the turntable ring adjacent to each end of all four roller carriers where the strains are greatest. The front ends of the truss bars 15 are preferably extended and equipped with connections 25 to receive a draft coupling.

The herein described construction is simple and economical to manufacture and easy to assemble.

The truck mechanism proper comprises, in addition to the wheeled axle, the inner ring 12, truss bars 15, tie bars 16, curved plates 17 and brace bars 24. The vehicle ring 11 is slipped over the truck ring and held turnably in place by the clips 23 and the fore and aft extending fastening bars 18. The load is evenly distributed on the roller bearings and the position of these bearings is such as to prevent sidewise rocking of the truck or vehicle, while fore and aft rocking tendencies will be restrained by the arcuate plates 17.

Various changes in the construction and arrangement of the several parts herein shown and described may be employed without departing from the spirit of my invention as disclosed in the appended claims.

Having thus described my invention, what I claim and desire to secure by Letters Patent is—

1. A steering truck for vehicles comprising a wheeled axle, relatively turnable inner and outer cylindrical rings, one carried by the vehicle frame and the other by the truck, the latter serving as a sole guide for the vehicle ring and the interior of the rings being open and unobstructed to permit the upper portion of the truck wheel to project within, and roller bearings depending from the truck ring and lying beneath the vehicle ring to support the latter.

2. A steering truck for vehicles comprising a wheeled axle, relatively turnable inner and outer cylindrical rings, one carried by the vehicle frame and the other by the truck, the latter serving as a sole guide for the vehicle ring and the interior of the rings being open and unobstructed to permit the upper portion of the truck wheel to project within, roller bearings depending from the truck ring and lying beneath the vehicle ring to support the latter, and means for supporting the truck ring upon the axle of the truck comprising fore and aft extending, upwardly bowed truss bars and upwardly extending supports near each end of the axle in line therewith and secured to the adjacent sides of the truck ring.

3. In a steering truck for vehicles, relatively turnable inner and outer cylindrical rings, the outer one carried by the vehicle frame and the inner one by the truck, roller carriers detachably connected to the inner circumference of the truck ring at diametrically opposite points and extending downwardly and beneath the outer ring, and a plurality of roller bearings journaled in each carrier and engaging beneath and supporting the vehicle ring.

4. A steering truck comprising a wheeled axle, upwardly bowed truss bars thereon extending transversely of the axle, tie bars connecting the upper ends of each truss bar, arcuate plates connecting the adjacent ends of opposite truss bars, a ring fixed upon the arcuate bars, roller bearings carried by said ring, and a ring carried by the vehicle frame telescopically fitted over the truck ring and turnably resting on the rollers.

5. A steering truck comprising a wheeled axle, upwardly bowed truss bars thereon extending transversely of the axle, tie bars connecting the upper ends of each truss bar, arcuate plates connecting the adjacent ends of opposite truss bars, a ring fixed upon the arcuate bars, roller bearings carried by said ring, and a ring carried by the vehicle frame telescopically fitted over the truck ring and turnably resting on the rollers, said arcuate plates being angular in cross section and each having a vertical flange lying outside of the vehicle ring.

6. A steering truck for vehicles comprising a wheeled axle, upwardly bowed truss bars thereon extending transversely of the axle, tie bars connecting the upper ends of each truss bar, arcuate plates connecting adjacent ends of opposite truss bars, a ring fixed upon the arcuate plates, brace bars connected to the ring at points opposite to the sides of the truck wheel and extending downwardly and connected to the axle, a roller carrier detachably connected to the ring intermediate the points of connection of the truss and brace bars therewith, a ring carried by the vehicle frame telescopically fitted over the first mentioned ring, and roller bearings journaled in said carriers in position to engage beneath the vehicle ring and support the same.

7. A steering truck for vehicles comprising a wheeled axle, upwardly bowed truss bars thereon extending transversely of the axle, tie bars connecting the upper ends of each truss bar, arcuate plates connecting adjacent ends of opposite truss bars, a ring fixed upon the arcuate plates, brace bars connected to the ring at points opposite to the sides of the truck wheel and extending downwardly and connected to the axle, a roller carrier detachably connected to the ring intermediate the points of connection of the truss and brace bars therewith, a ring carried by the vehicle frame telescopically fitted over the first mentioned ring, roller bearings journaled in said carriers in position to engage beneath the vehicle ring and support the same, and fastening bars extending parallel with the tie bars, overlying both rings and connected to said tie bars.

In testimony whereof I have hereunto set my hand in the presence of two subscribing witnesses.

WILLIAM H. PUTTOCK.

Witnesses:
PAUL R. RICKS,
CHAS. S. LOVEDAY.